United States Patent
Montgomery et al.

(10) Patent No.: US 12,111,237 B2
(45) Date of Patent: Oct. 8, 2024

(54) SYSTEM FOR AEROSOL SAMPLING DURING MECHANICAL LOAD

(71) Applicant: UT-Battelle, LLC, Oak Ridge, TN (US)

(72) Inventors: Rosemary A. Montgomery, Oak Ridge, TN (US); Meng-Dawn Cheng, Oak Ridge, TN (US); Yadukrishnan Sasikumar, Oak Ridge, TN (US); Bruce B. Bevard, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 419 days.

(21) Appl. No.: 17/469,419

(22) Filed: Sep. 8, 2021

(65) Prior Publication Data
US 2024/0118177 A1    Apr. 11, 2024

Related U.S. Application Data (60) Provisional application No. 63/078,623, filed on Sep. 15, 2020.

(51) Int. Cl.
*G01N 1/22* (2006.01)
*G21C 17/06* (2006.01)

(52) U.S. Cl.
CPC ......... *G01N 1/2202* (2013.01); *G01N 1/2211* (2013.01); *G21C 17/06* (2013.01); *G01N 2001/2223* (2013.01); *G01N 2203/0019* (2013.01); *G01N 2203/0021* (2013.01); *G01N 2203/0023* (2013.01); *G01N 2203/0025* (2013.01)

(58) Field of Classification Search
CPC ............... G01N 1/2202; G01N 1/2211; G01N 2001/2223; G01N 2203/0019; G01N 2203/0021; G01N 2203/0023; G01N 2203/0025; G21C 17/06
USPC ........................................................ 73/28.01
See application file for complete search history.

(56) References Cited

U.S. PATENT DOCUMENTS

| | | | | |
|---|---|---|---|---|
| 5,400,665 A | * | 3/1995 | Zhu | H05H 1/42 |
| | | | | 73/864.81 |
| 5,416,024 A | * | 5/1995 | Smith | G01N 33/241 |
| | | | | 850/16 |

(Continued)

FOREIGN PATENT DOCUMENTS

KR    20170012260 A * 2/2017

OTHER PUBLICATIONS

Heichelheim et al., "Aerosol Generation In Compressive Concrete Fragmentation", Construction and Building Materials, 2017, pp. 1039-1049, vol. 155.

*Primary Examiner* — Marrit Eyassu
(74) *Attorney, Agent, or Firm* — WARNER NORCROSS + JUDD LLP (57) ABSTRACT

A system for sampling aerosols, for purpose of predictive analyses, from fractured test specimens is provided. The system includes a test enclosure, a load apparatus, and an aerosol sampling pack in fluid communication with the test enclosure. The test enclosure is sized to partially or completely receive the test specimen therein, and the load apparatus is configured to impart a mechanical load (e.g., tension, bending, torsion, shear forces, or compression) on the test specimen. The aerosol sampling pack receives solid aerosols that are generated upon fracture of the test specimen.

19 Claims, 7 Drawing Sheets

(56) References Cited

U.S. PATENT DOCUMENTS

| | | | |
|---|---|---|---|
| 6,401,520 B1* | 6/2002 | Volkwein | G01N 1/2205 |
| | | | 73/863.22 |
| 2009/0193971 A1 | 8/2009 | McFarland et al. | |
| 2010/0163761 A1* | 7/2010 | Febo | G01N 15/0625 |
| | | | 250/573 |
| 2014/0196549 A1* | 7/2014 | Witham | G01N 1/2208 |
| | | | 73/863.22 |

\* cited by examiner

SYSTEM FOR AEROSOL SAMPLING DURING MECHANICAL LOAD

CROSS-REFERENCE TO RELATED APPLICATIONS

This application claims the benefit of U.S. Provisional Application 63/078,623, filed Sep. 15, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to aerosol particle sampling, in particular, the sampling of aerosols that are generated by fractured test specimens.

BACKGROUND OF THE INVENTION

An aerosol is generally defined as a colloid of fine solid particles or liquid droplets in air or another gas. Aerosols can result from natural processes, such as fog, or from human activity, such as industrial processes. There exists a number of regulations and guidelines related to the quantity of aerosols in indoor air, as promulgated by organizations such as the Occupational Safety and Health Administration (OSHA), the National Institute for Occupational Safety and Health (NIOSH), and the Environmental Protection Agency (EPA). The upper limit of human respirability is generally considered to be 10 μm, as these particles can penetrate all the way to the alveoli when inhaled and can lodge there and cause damage. While larger particles from 10 to 100 microns (referred to as "total dust") can be breathed in, they don't typically penetrate to the alveoli.

Cascade impactors and cyclone separators are wearable aerosol sampling devices that sample and separate aerosols according to their inertia. These sampling devices are not used to predict exposure, but are instead used to indicate and track individual personal levels of exposure. In some applications, however, it is desirable to predict levels of aerosol exposure. For example, there exists no known mechanism to predict levels of aerosol exposure resulting from the fracture (in bending, torsion, tension, shear, or compression) of spent nuclear fuel rods. This data can be essential to support the transportation of nuclear fuel, especially high-burnup spent nuclear fuel.

For example, the transportation risks related to the dispersion of radionuclides released during an accident and their release path as aerosol particles are of particular interest. (NUREG-2125, *Spent Fuel Transportation Risk Assessment and Final Report*, Office of Nuclear Materials Safety and Safeguards, 2014; Benke et al, *Potential Releases Inside a Spent Nuclear Fuel Dry Storage Cask Due to Impacts: Relevant Information and Data Needs*, CNWRA-2012-001, 2012). Prior research has demonstrated that if nuclear fuel cladding is breached, spent nuclear fuel pellets can be oxidized from $UO_2$ to $U_3O_8$ at dry storage temperatures. (Royer et al, *Modeling of the Spent Nuclear Fuel Oxidation: Toward the Operational Model*, Journal of Nuclear Materials, Vol. 395, p. 8, 2009). During oxidation, the pellets expand in volume by as much as 31%. As a result, the cladding can be over-strained, potentially resulting in a much larger breach with increased aerosol release. Others have initially quantitatively addressed the generation and release of aerosols through spent nuclear fuel cladding fracture using a generalized approach (Sanders et al, *A Method for Determining Spent-Fuel Contribution to Transport Cask Contamination Requirements*, SAND90-2406, Sandia National Laboratory, 1992).

Wearable cascade impactors and cyclone separators are poorly suited for a predictive analysis of the release of aerosols, particularly aerosols released from spent nuclear fuel. Accordingly, there remains a continued need for systems that are uniquely suited for the sampling of aerosols released from specimens when fractured in tension, bending, torsion, or compression, including spent nuclear fuel and other specimens, including for example concrete, asbestos, coal (fly ash), and ceramics.

SUMMARY OF THE INVENTION

A system for sampling aerosols, for purpose of predictive analyses, from fractured test specimens is provided. The system includes a test enclosure, a load apparatus, and an aerosol sampling pack in fluid communication with the test enclosure. The test enclosure is sized to partially or completely receive the test specimen therein, and the load apparatus is configured to impart a mechanical load (e.g., tension, bending, torsion, shear forces, or compression) on the test specimen. The aerosol sampling pack receives solid aerosols that are generated upon fracture of the test specimen.

In one embodiment, the test enclosure is a partial enclosure that is shaped to receive a rod-shaped test specimen therein and sample at the known fracture location. The partial enclosure includes a separate base and lid, both of which include lateral slots for fixturing that interfaces with the specimen and applies the loads necessary to induce fracture of the specimen. The base portion also includes an access opening for a sampler conduit. The partial enclosure is used where a secondary system, such as a fume hood, can be used during testing to ensure test personnel safety. This embodiment is currently configured for fracture in bending and is used where the test specimen is expected to fail in a bending scenario, but can be configured for other fracture scenarios. This embodiment is also used where the test specimen comprises spent nuclear fuel, the test enclosure, the load apparatus, and the aerosol sampling pack can be contained within a hot cell.

In another embodiment, the test enclosure is shaped to completely receive a test specimen therein. The exterior of the test enclosure includes an opening for a load frame and includes a viewing window. The interior of the test enclosure includes a load apparatus and an aerosol sampling pack. The load apparatus is operatively connected to the load frame, which is positioned outside of the test enclosure. For example, the load apparatus can include a moving cross-member having two load pins and a fixed cross-member having two support pins for a four-point bending test. A vacuum pump within the test enclosure draws aerosols into the aerosol sampling pack, for example a cyclone sampler pack or a cascade sampler pack. This embodiment can also include a wash system for rinsing the inside walls of the test enclosure. The wash system can include six low pressure nozzles that are oriented toward the test enclosure sidewalls. The rinsing liquid, for example water or alcohol, is directed into a funnel at the base of the test enclosure and drained to a collection bottle, which may also be sampled for particulates. This embodiment is used when a secondary system is not available to protect personnel during testing. Further, this embodiment may be configured for tension, bending, torsion, shear, or compression loads.

The present invention is configured to sample solid phase aerosols within a prescribed range of particle diameters (e.g., 0.5 to 10 μm) released from a test specimen as it is fractured in response to a mechanical load. As one example, the present invention can be used to sample aerosols that are released from fractured fuel rods to estimate the quantity of radioactive aerosol material that would be released if spent commercial power rods were fractured in a transportation accident. The present invention is also well suited for applications where it is desirable to define the respirable fraction of aerosols resulting from particular actions, such as the manufacture of a part by impact (e.g., by forging), housing industry tasks (e.g., remediation or replacement of insulation or piping components), or breaking down cardboard for recycling. The present invention is also well suited for use by industrial laboratories specializing in aerosol collection and characterization, for example, the characterization of aerosols produced by medical inhalers.

These and other features of the invention will be more fully understood and appreciated by reference to the description of the embodiments and the drawings.

DETAILED DESCRIPTION OF THE CURRENT EMBODIMENTS

The current embodiments include a system for sampling aerosols from fractured test specimens. The system includes a test enclosure, a load apparatus, and an aerosol sampling pack. The load apparatus is configured to impart tension, bending, torsion, shear forces, or compression on the test specimen, and the aerosol sampling pack is configured to sample the aerosols that are generated upon fracture of the test specimen. The load apparatus (e.g., the portion of a load frame that secures and loads the specimen) and the aerosol sampling pack can be external to or contained within the test enclosure. Examples of each embodiment are discussed below.

Figure 1:
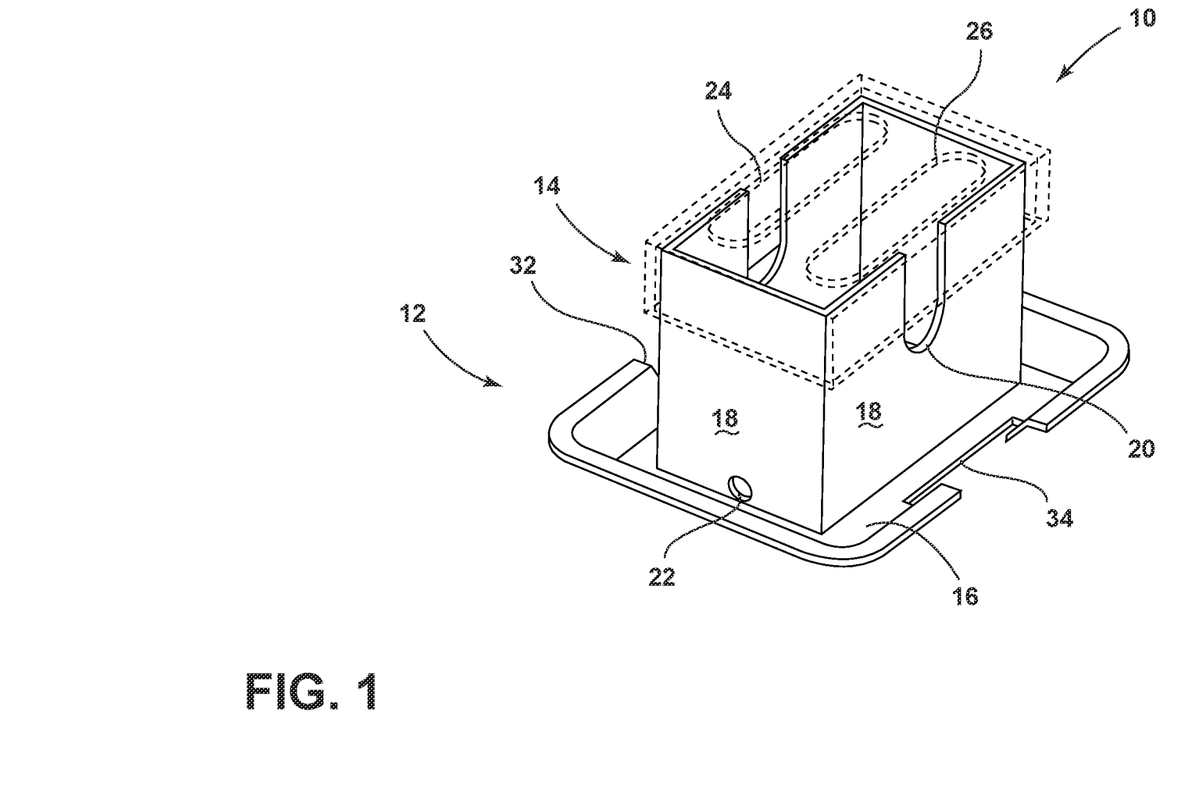
FIG. 1 is a perspective view of test enclosure to partially contain a rod-shaped test specimen therein.
Figure 2:
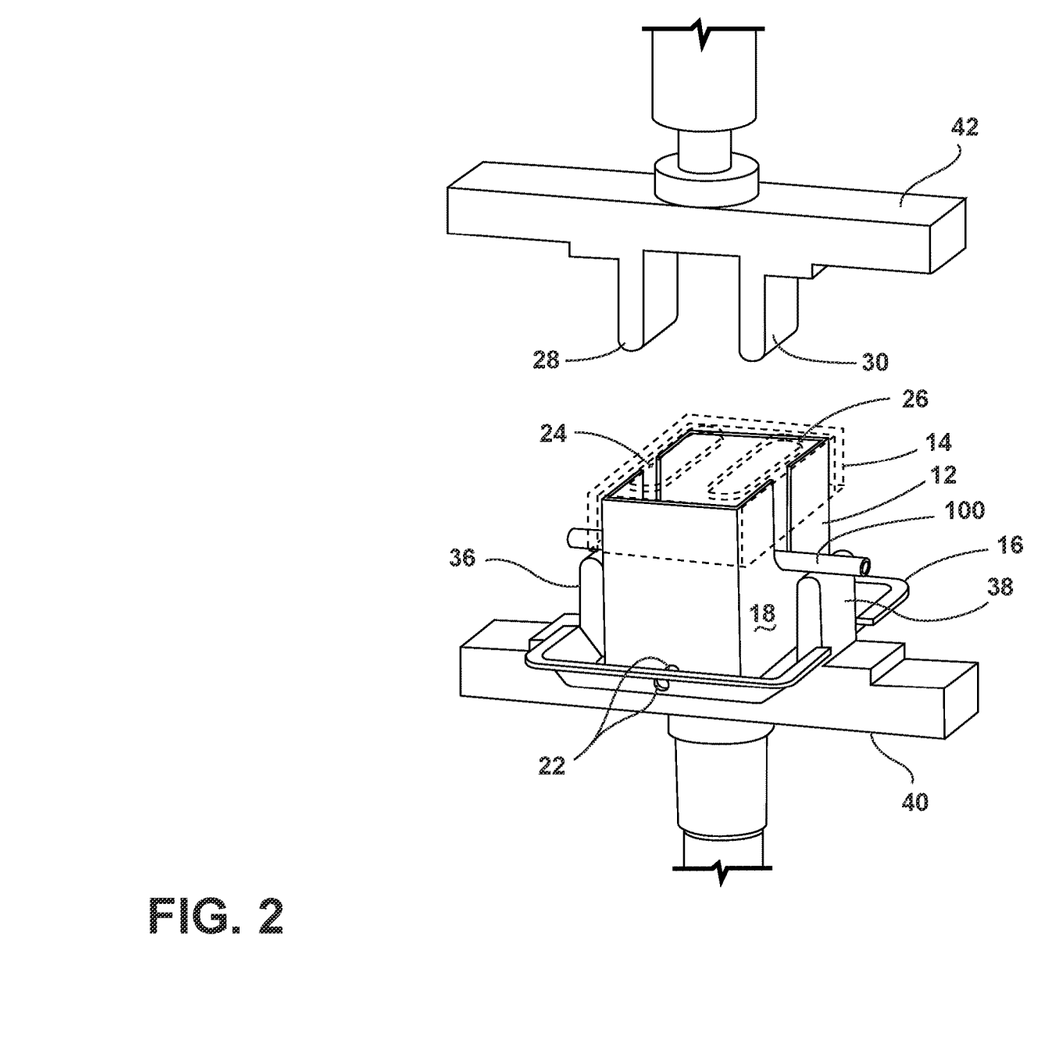
FIG. 2 illustrates the test enclosure of FIG. 1 in combination with a test specimen and a load apparatus.

Referring first to FIGS. 1-2, a test enclosure in accordance with one embodiment is illustrated and generally designated 10. The test enclosure 10 is illustrated in connection with a four-point bending load, but can be modified for essentially any bending load (e.g., three-point bending, four-point bending), compressive load (e.g., uniaxial, biaxial, and planar), tensile load (e.g., uniaxial, biaxial, and planar), shear load, or torsion load. The illustrated test enclosure 10 includes a base portion 12 and a lid portion 14. The base portion 12 and the lid portion 14 cooperate to partially house a rod-shaped test specimen 100 therein, test specimen being shown in FIG. 2. In particular, the base portion 12 includes an enlarged base tray 16 and four sidewalls 18. The enlarged base tray 16 provides stability to the test enclosure 10, and two sidewalls define a U-shaped notch 20 for passage of the test specimen 100 therethrough. The base portion 12 also includes an access opening 22 for a sampler conduit, discussed below.

As also shown in FIGS. 1-2, the lid portion 14 includes first and second openings 24, 26 for first and second load pins 28, 30, and the base tray 16 includes first and second slots 32, 34 for first and second support pins 36, 38. The support pins 36, 38 are slightly higher than the base of each U-shaped notch 20, such that the test specimen 100 is supported by the support pins 36, 38. The support pins 36, 38 are connected to a fixed crosshead 40, and the load pins 28, 30 are connected to a moving cross-head 42. Collectively, the support pins 36, 38, the load pins 28, 30, the fixed crosshead 40, and the moving cross-head 42 comprise the load apparatus. The test enclosure 10 helps fix the test specimen 100 in place, and the moving cross-head 42 moves down to apply a bending load to the test specimen 100. A load cell converts the measured load into an electrical signal for output to an integral controller. The fixed cross-head 40 and the moving cross-head 42 are supported across two columns, which collectively comprise the load frame. An example load frame includes the 5960 Series Load Frame by Instron of Norwood, Massachusetts, but other load frames can be used in other embodiments.

Figure 3:
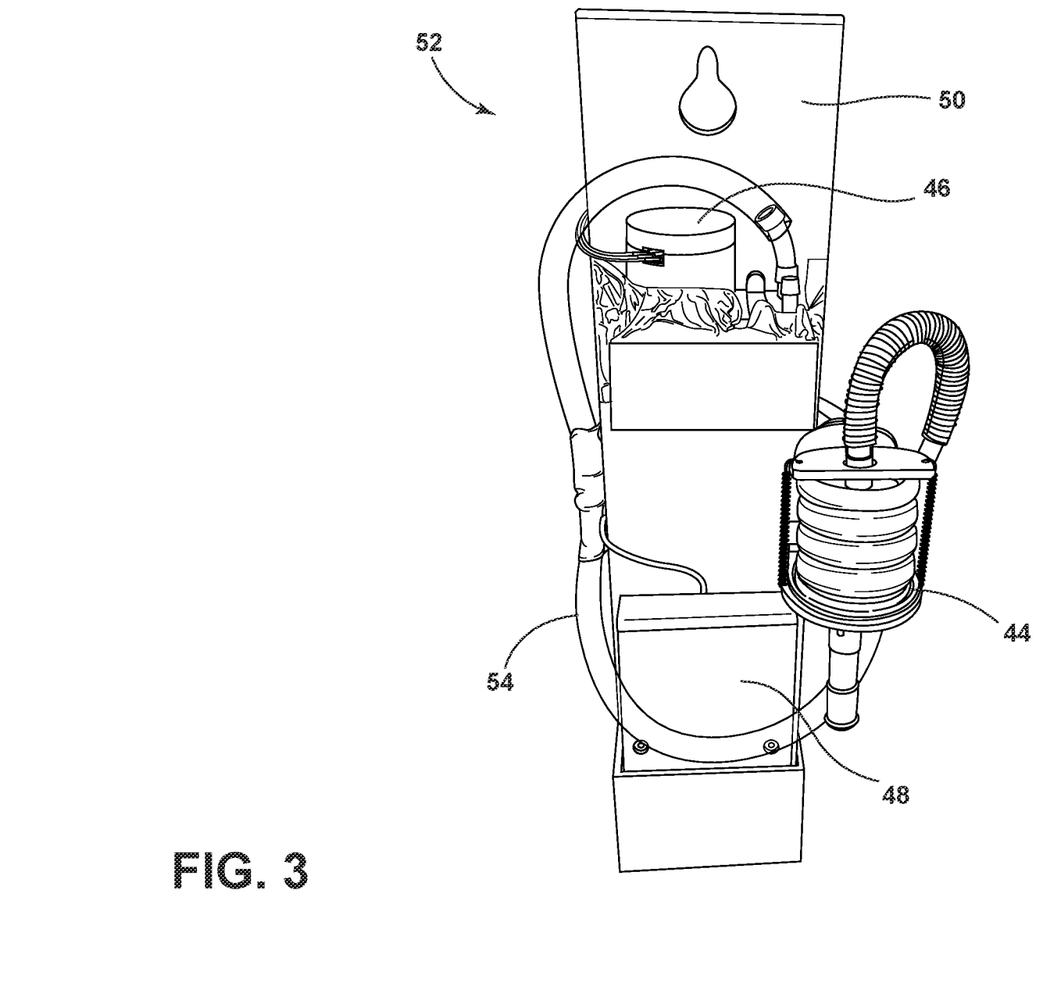
FIG. 3 illustrates an aerosol sampler pack, power module, and vacuum pump for use with the test enclosure of FIGS. 1-2.

As noted above, the base portion 12 includes an access opening 22 for a sampler conduit. The sampler conduit provides a fluid flow path between the test enclosure 10 and an aerosol sampler pack 44, shown in FIG. 3. Air is drawn into the aerosol sampler pack 44 with the aid of a dedicated vacuum pump 46, the vacuum pump including an integral potentiometer for flow rate adjustment. The vacuum pump 46 is driven by an on-board power supply 48, for example a battery pack, to allow portability of the aerosol sampling pack 44, vacuum pump 46, and power supply 48, each being supported on an upright sensor bracket 50, collectively forming a sensor assembly 52. The aerosol sampler pack 44 in the illustrated embodiment is a cyclone sampler pack, but can be a cascade sampler pack in other embodiments. The cyclone sampler pack 44 samples and separates aerosols by the use of a centrifugal force. As aerosols enter the cyclone sampler pack 44 from the sampler conduit 54, the aerosols are accelerated to a speed sufficient to cause large aerosol particles outside of the sampling range to fall out of the flow, while particles within of the sampling range are deposited onto a filter within the cyclone sampler pack. By contrast, a cascade sampler pack will contain multiple collection stages arranged in series, with each collection stage having an orifice plate and a separate, removable collection surface below the orifices. With each successive stage, the orifice cross-sectional areas decrease in order to increase the velocity of the aerosol-laden air, and only particles small enough to remain within the flow pass to the next stage, while particles within the cut point range of the current stage are deposited. Example sampler packs include the Sioutas Personal Cascade Impactor and the Respirable Dust Aluminum Cyclone, each by SKC, Inc. Though not shown, the sensor assembly 52 can include an aerodynamic particle sizer (spectrometer) for independently sizing the aerosols.

Figure 4:
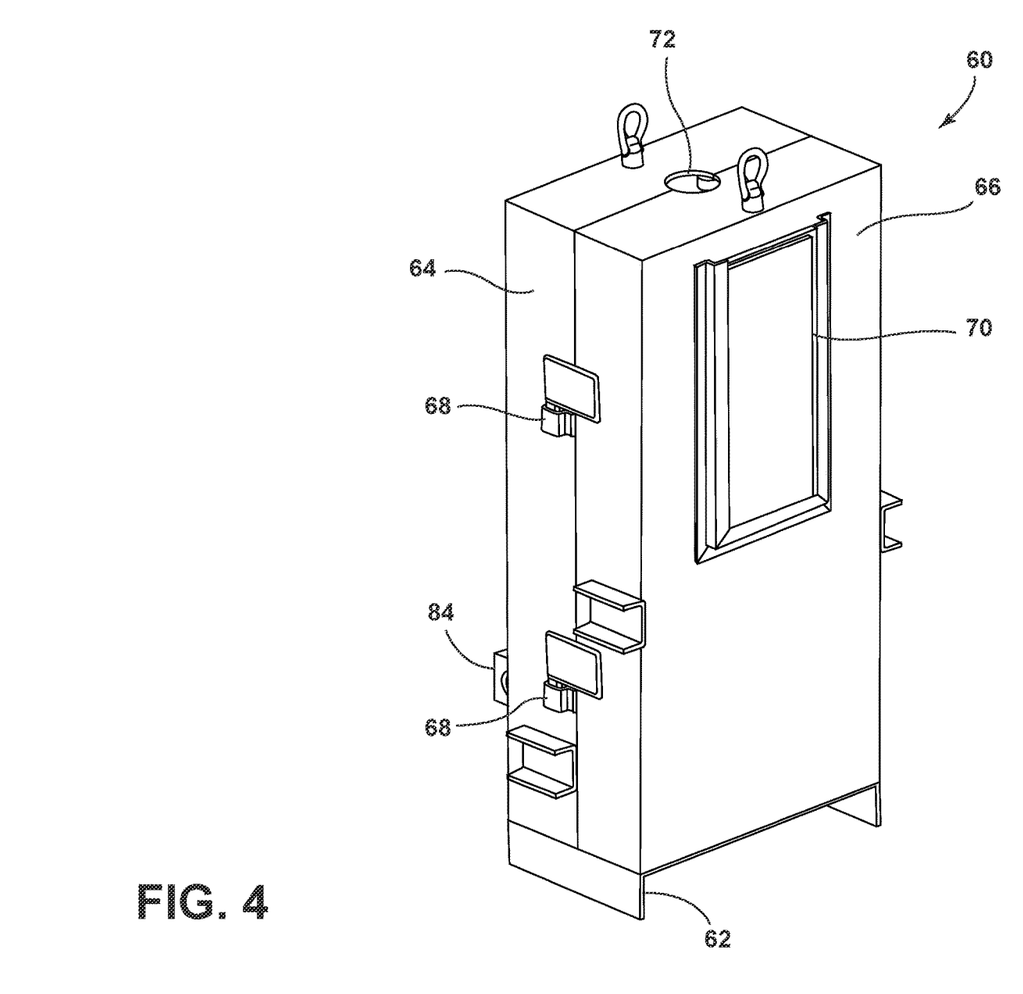
FIG. 4 is a perspective view of a test enclosure in accordance with another embodiment.
Figure 5:
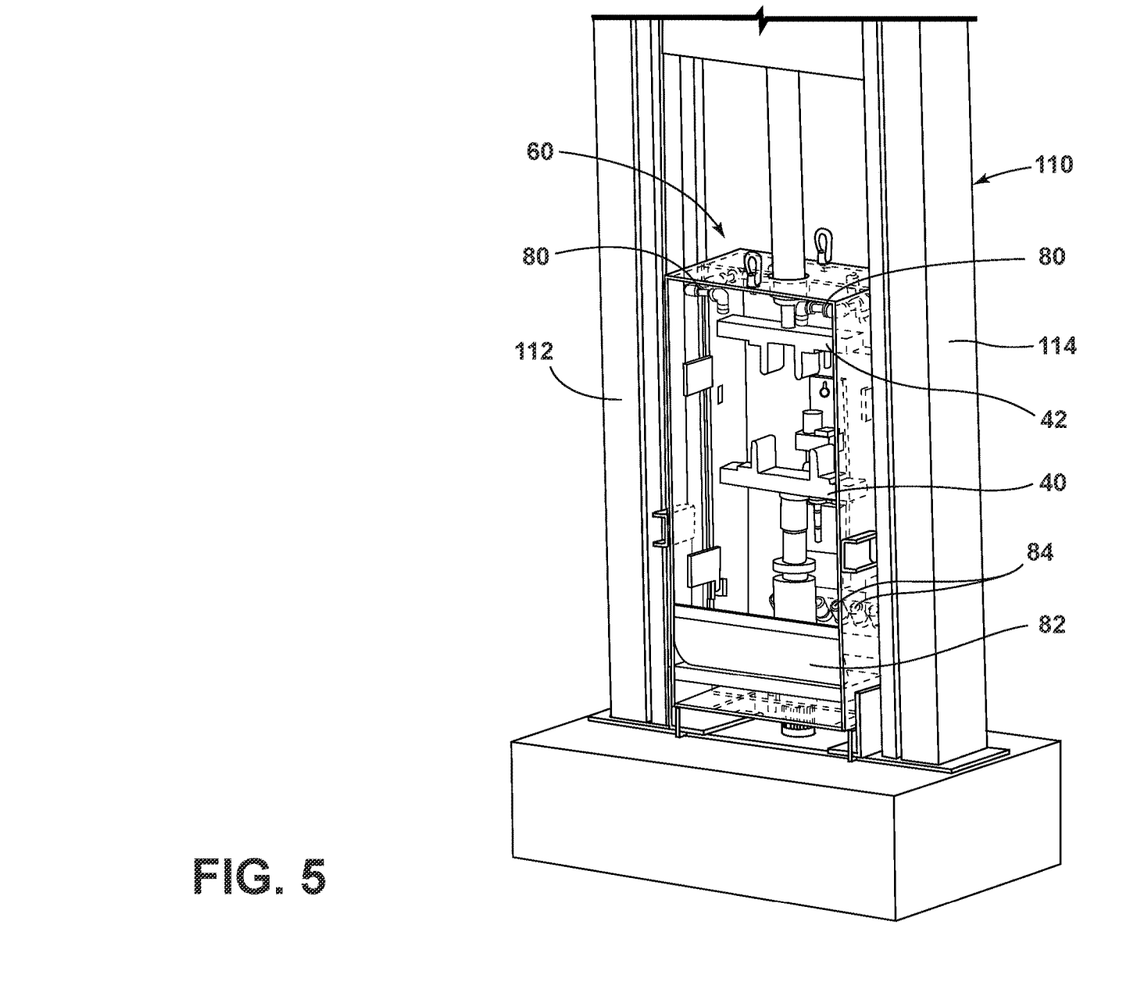
FIG. 5 is a perspective view of the test enclosure of FIG. 4 in combination with a load frame, with the front frame being omitted for clarity.

As alternatively shown in FIGS. 4-5, a test enclosure in accordance with a further embodiment is illustrated and generally designated 60. The test enclosure 60 is positioned on a load frame 110 between two columns 112, 114, and the load apparatus and the aerosol sampling pack are contained within the test enclosure 60. The test enclosure 60 includes a base platform 62, a four-sided back frame 64, and a four-sided front frame 66. The front frame 66 is joined to back frame 64 along first and second hinges 68, such that the front frame 66 can open for access to the interior of the test enclosure 60. The front frame 66 includes a viewing window 70, the viewing window optionally being formed from ballistic glass. The front and rear frames 64, 66 are formed from aluminum, but can be formed from other materials in other embodiments.

The load frame 110 extends into the interior of the test enclosure 60 via a lower opening in the base platform 62 and via an upper opening 72 defined between the back frame 64 and the front frame 66. The test enclosure 60 also includes a system for rinsing the inside walls of the test enclosure. The system for rinsing the inside walls can include one or more atomizing spray nozzles 80 and a rinse collection tray 82. The spray nozzles 80 are supported near the uppermost portion of the test enclosure 60 and are oriented toward the enclosure sidewalls to avoid spraying the test specimen. Each spray nozzle 80 provides a desired spray pattern, for example a solid cone spray pattern, a hollow cone spray pattern, or a tapered-edge flat spray pattern. The rinsing liquid, for example water or alcohol, can be directed into a funnel (not shown) at the base of the test enclosure and drained to a collection bottle, which may also be sampled for particulates.

Figure 6:
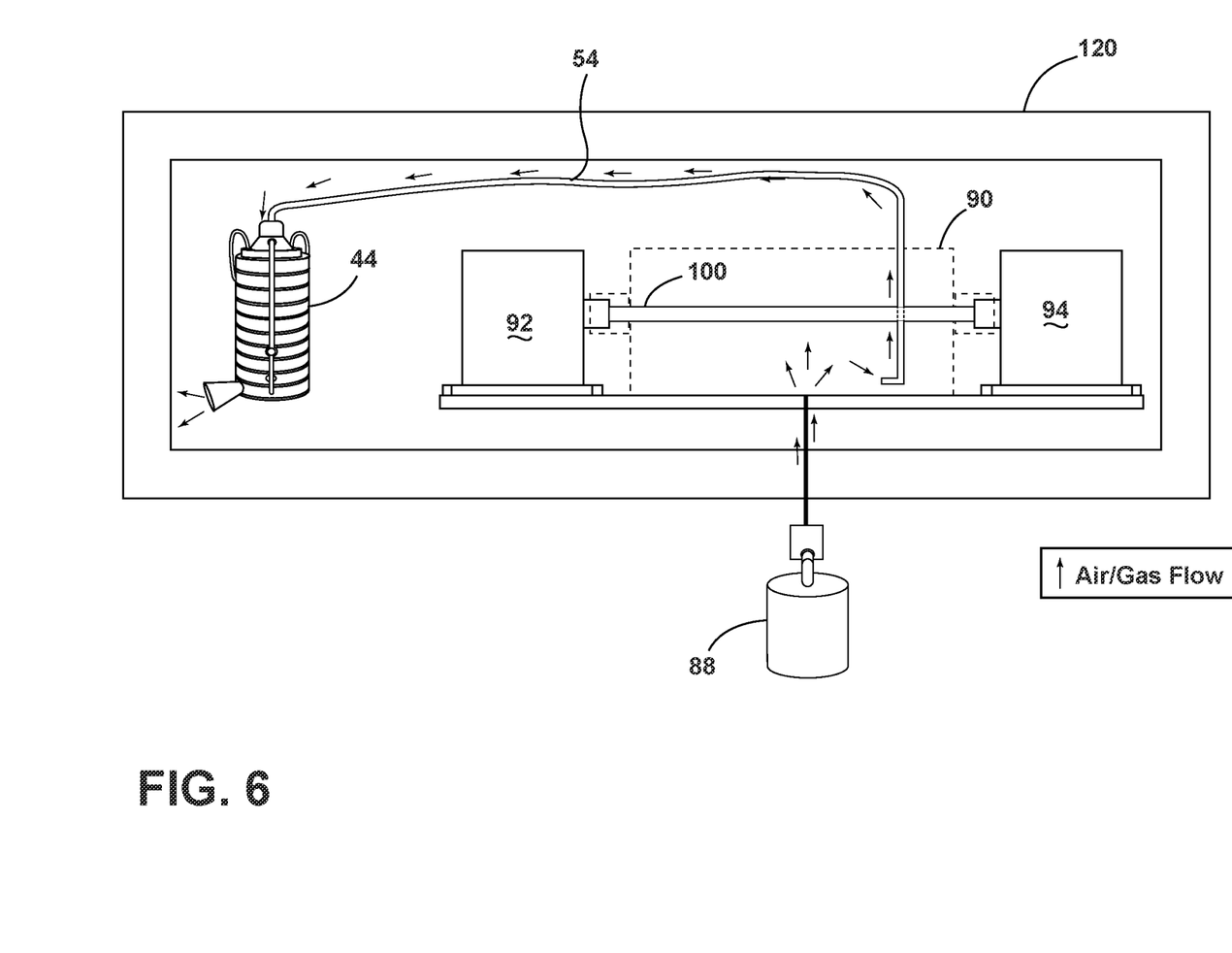
FIG. 6 is a schematic diagram of a further embodiment of a system for sampling aerosols as contained within a hot cell.

As also shown in FIG. 6, the test enclosure 60 houses a load apparatus. The load apparatus includes a fixed cross-member 40 and a moving cross-member 42 for providing a four-point bending load. The load apparatus can be modified in other embodiments to provide essentially any bending load, torsion load, compressive load, shear load, or tensile load. The fixed cross-member 40 is even with the viewing window 70. To provide aerosol sampling, at least one sensor assembly 52 (shown in FIG. 3) is contained within the test enclosure 60, optionally two or more sensor assemblies, further optionally three sensor assemblies. Each sensor assembly 52 includes an aerosol sampling pack 44, a vacuum pump 46, and a power supply 48. The sensor assemblies 52 are modular, such that each sensor assembly 52 can be replaced between fracture tests. The test enclosure 60 can also include a gas inlet 84 at the base of the enclosure for providing an inert gas under positive pressure. For example, the gas inlet 84 can provide a slow inert gas flow to ensure that the gas in the test enclosure remains mixed.

Figure 7:
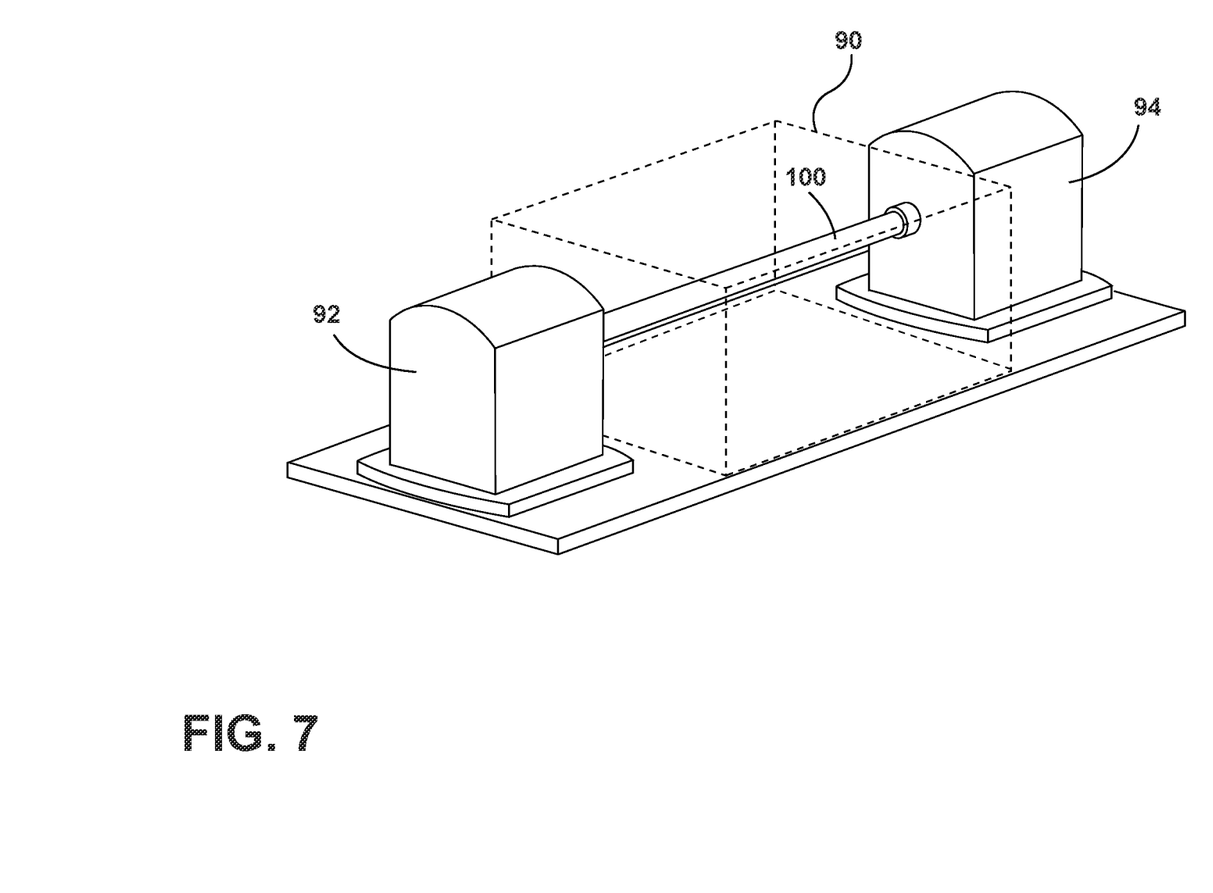
FIG. 7 is a perspective view of the system for sampling aerosols of FIG. 6.

As further optionally shown in FIGS. 6-7, a system for sampling aerosols from fractured fuel rods is illustrated. The system in this embodiment is intended to sample uranium dioxide or solid fission product particles in the fission and fill gases of a fractured fuel rod if released through a breach in the fuel rod cladding. The test enclosure 90 is contained within a hot cell 120 and is formed from transparent, shatterproof material, for example ballistic glass. Inert gas is forced into the test enclosure 90 (from gas source 88) under positive pressure to agitate the aerosols, which are drawn into the aerosol sampler 44 via the sampler conduit 54. Though not shown, a vacuum pump can be positioned within the hot cell 120 to draw aerosols into the aerosol sampler 44 in the manner set forth above in connection with FIGS. 1-5.

The load mechanism in this embodiment includes first and second rotary motors 92, 94 that provide flexure to the test specimen 100. The load mechanism further optionally imparts vibrations on the test specimen 100, also leading to fracture and the generation of aerosols for collection and analysis by the aerosol sampler 44.

These and other embodiments are configured to sample any solid phase aerosols released from a test specimen as it is fractured. As noted above in connection with FIGS. 6-7, the present invention can be used to sample aerosols that are released from fractured fuel rods to estimate the quantity of radioactive aerosol material that would be released if a spent commercial power rod were fractured in a transportation accident. The present invention is also well suited for applications where it is desirable to define the respirable fraction of aerosols resulting from particular actions, such as the manufacture of a part by impact (e.g., by forging), housing industry tasks (e.g., remediation or replacement of insulation or piping components), or breaking down cardboard for recycling. The present invention is also well suited for use by industrial laboratories specializing in aerosol collection and characterization, for example, the characterization of aerosols produced by medical inhalers.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system for sampling solid aerosols, the system comprising:
   a test enclosure to at least partially receive a rod-shaped test specimen that is to release solid aerosols when fractured, wherein the test enclosure includes:
   a base portion, the base portion including a base tray and a plurality of sidewalls extending upwardly therefrom, wherein first and second ones of the plurality of sidewalls are positioned opposite each other and include a notch along an upper periphery thereof, wherein the base tray includes first and second slots along a lateral periphery thereof, the base portion further including an access opening for a sampler conduit, and a lid portion, the lid portion being adapted to fit over the base portion and including first and second openings extending entirely through the lid portion;

a mechanical-test apparatus configured to apply a mechanical load to the rod-shaped test specimen while the rod-shaped test specimen is at least partially received within the test enclosure, wherein the mechanical-test apparatus includes a fixed cross-head and a movable cross-head, wherein the base portion is supported atop the fixed cross-head, the fixed cross-head including a first support pin extending upwardly through the first slot in the base tray and including a second support pin extending upwardly through the second slot in the base tray, wherein the movable cross-head includes a first load pin extending downwardly in alignment with the first opening in the lid portion and includes a second load pin extending downwardly in alignment with the second opening in the lid portion; and one or more sampling packs configured to detect the solid aerosols to be released by the rod-shaped test specimen; and a pump for drawing the solid aerosols through the sampler conduit to the one or more sampling packs;

wherein the test enclosure is adapted to receive the rod-shaped test specimen horizontally through the first and second notches of the first and second sidewalls of the base portion, such that the rod-shaped test specimen is held in place while subjected to a bending load from the mechanical-test apparatus when the first and second load pins of the movable cross-head are lowered into engagement with the rod-shaped test specimen.

2. The system of claim 1, further including a source of inert gas to provide an inert gas inside the test enclosure.

3. The system of claim 1, wherein the one or more sampling packs include a cyclone sampler pack or a cascade sampler pack.

4. The system of claim 1, wherein the pump is a vacuum pump, the system further including a power supply that is configured to provide local power to the vacuum pump.

5. The system of claim 1, further comprising an aerodynamic particle sizer configured to determine sizes of the solid aerosols released by the rod-shaped test specimen.

6. The system of claim 1, further comprising a means for rinsing inside walls of the test enclosure upon completion of a mechanical test and for removing solid aerosols deposited on the inside walls during the mechanical test.

7. The system of claim 1, wherein the solid aerosols are released by the rod-shaped test specimen when the mechanical load causes fracture of the specimen.

8. The system of claim 7, wherein the mechanical load that causes the fracture of the rod-shaped test specimen is a four-point bending load.

9. The system of claim 1, wherein the rod-shaped test specimen comprises spent nuclear fuel.

10. The system of claim 9, wherein the spent nuclear fuel comprises high burnup spent nuclear fuel.

11. The system of claim 9, wherein the spent nuclear fuel comprises uranium dioxide.

12. The system of claim 9, wherein the spent nuclear fuel is shaped as a rod.

13. The system of claim 1, wherein the rod-shaped test specimen comprises asbestos or concrete.

14. A system comprising:

a test enclosure configured to supportably receive a rod-shaped test specimen therein, the test enclosure including a lid portion and a base portion, wherein:

the lid portion is adapted to fit over the base portion and includes first and second openings extending entirely through the lid portion, and the base portion includes a base tray and a plurality of sidewalls extending upwardly therefrom, wherein first and second ones of the plurality of sidewalls are positioned opposite each other and include first and second side openings, respectively, to receive the rod-shaped test specimen therethrough, wherein the base tray includes first and second slots along a lateral periphery thereof, the base portion further including an access opening for a sampler conduit;

a load apparatus configured to apply a mechanical bending load to the rod-shaped test specimen when the rod-shaped test specimen is supportably received within the test enclosure, wherein the load apparatus includes a fixed cross-head and a movable cross-head, wherein the base portion of the test enclosure is supported atop the fixed cross-head, the fixed cross-head including a first support pin extending upwardly through the first slot in the base tray and including a second support pin extending upwardly through the second slot in the base tray, wherein the movable cross-head includes a first load pin extending downwardly in alignment with the first opening in the lid portion and includes a second load pin extending downwardly in alignment with the second opening in the lid portion; and an aerosol sampling pack in fluid communication with the test enclosure via the sampler conduit, wherein the test enclosure is adapted to receive the rod-shaped test specimen horizontally through the first and second side openings of the base portion, such that the rod-shaped test specimen is held in place while subjected to a bending load from the mechanical-test apparatus when the first and second load pins of the movable cross-head are lowered into engagement with the rod-shaped test specimen, wherein the aerosol sampling pack is adapted to detect solid aerosols released by the rod-shaped test specimen if fractured when subjected to the mechanical bending load.

15. The system of claim 14 further including:

a vacuum pump to draw the solid aerosols into the sampler conduit.

16. The system of claim 14, wherein the aerosol sampling pack includes a cyclone sampler pack or a cascade sampler pack.

17. The system of claim 14, further comprising an aerodynamic particle sizer configured to determine sizes of the solid aerosols released by the rod-shaped test specimen.

18. The system of claim 14, wherein the load apparatus is adapted to impart a four-point bending load on the rod-shaped test specimen.

19. The system of claim 14, wherein the sampling pack comprises a battery configured to provide local power.

* * * * *